(12) United States Patent
Saito

(10) Patent No.: US 6,989,871 B2
(45) Date of Patent: Jan. 24, 2006

(54) IMAGE-SIGNAL PROCESSING APPARATUS FOR CLAMPING ANALOG IMAGE SIGNAL AND THEN FOR CONVERTING IT TO DIGITAL IMAGE SIGNAL

(75) Inventor: Junichi Saito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 571 days.

(21) Appl. No.: 10/133,060

(22) Filed: Apr. 25, 2002

(65) Prior Publication Data

US 2003/0001971 A1    Jan. 2, 2003

(30) Foreign Application Priority Data

May 11, 2001   (JP)   ............... 2001-141978

(51) Int. Cl.
H04N 5/52   (2006.01)

(52) U.S. Cl. ..................... 348/572; 348/573

(58) Field of Classification Search ........... 348/572, 348/695, 689, 677, 573
See application file for complete search history.

(56) References Cited

U.S. PATENT DOCUMENTS

| | | | | |
|---|---|---|---|---|
| 4,651,213 A | * | 3/1987 | Takimoto | .................. 348/697 |
| 5,008,753 A | * | 4/1991 | Kitaura et al. | .............. 348/695 |
| 5,191,422 A | * | 3/1993 | Cho et al. | ................... 348/695 |
| 5,200,833 A | * | 4/1993 | Suzuki | ........................ 386/20 |
| 5,339,114 A | * | 8/1994 | Lagoni et al. | ............... 348/673 |
| 5,341,218 A | * | 8/1994 | Kaneko et al. | ............. 348/695 |
| 5,708,482 A | * | 1/1998 | Takahashi et al. | .......... 348/695 |
| 6,002,445 A | * | 12/1999 | Urayama | .................... 348/572 |

\* cited by examiner

*Primary Examiner*—Paulos M. Natnael

(74) *Attorney, Agent, or Firm*—Beyer, Weaver & Thomas LLP

(57) ABSTRACT

An analog Y signal input from an input terminal 101 is clamped at a pedestal level in a clamp circuit 102, and then, is converted to a digital image signal in a quantization circuit 103. The pedestal level Dp of the digital output D(t) 113 is stored in a register 702. A predetermined value Dref (Dref=0 for the Y signal) is subtracted from Dp in a subtracter 802. The subtraction output 806 is subtracted from the digital output 113 in a subtracter 803. The subtraction output 805 (D(t)−(Dp−Dref)) is a signal for which a shift caused by a variation in the precision of the clamp circuit 102 and the quantization circuit 103 has been compensated for. The subtraction output 805 is limited to a predetermined dynamic range by an overflow limiter circuit 807, and output as Dout.

9 Claims, 14 Drawing Sheets

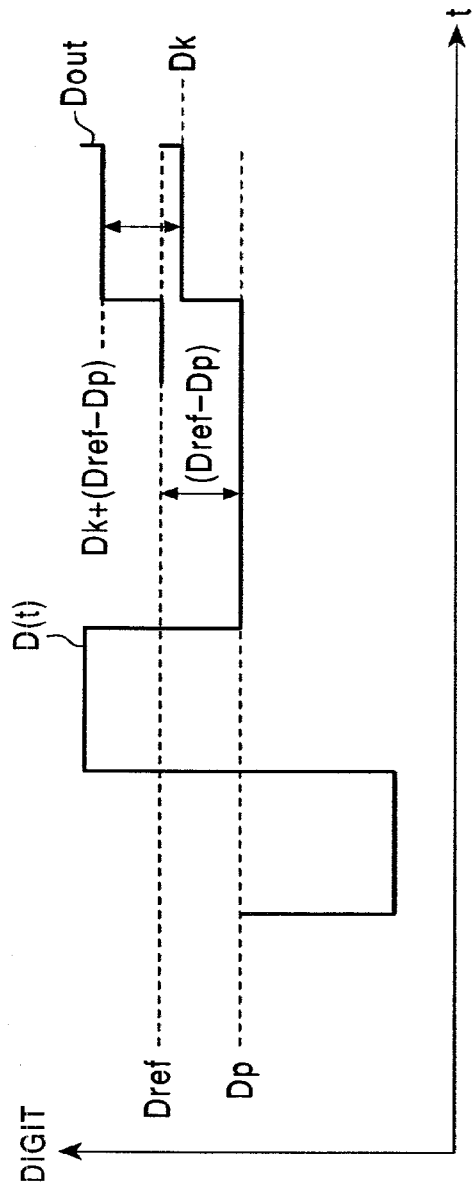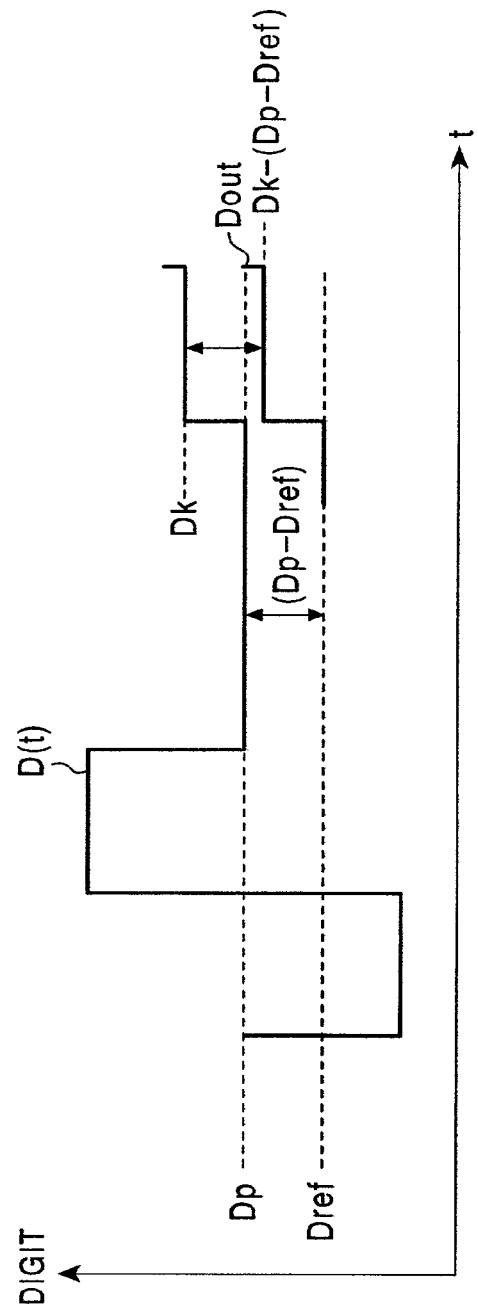
FIG. 3A
FIG. 3B

IMAGE-SIGNAL PROCESSING APPARATUS FOR CLAMPING ANALOG IMAGE SIGNAL AND THEN FOR CONVERTING IT TO DIGITAL IMAGE SIGNAL

BACKGROUND OF THE INVENTION

1. Field of the Invention

The present invention relates to image-signal processing apparatuses which clamp an analog image signal, such as Y, Pb, and Pr signals, and then convert it to a digital image signal, and image display apparatuses, such as TV-camera viewfinders, which use the image-signal processing apparatuses.

2. Description of the Related Art

FIG. 10 is a block diagram of an image-signal processing apparatus used in a conventional image display apparatus, such as a TV-camera viewfinder.

In FIG. 10, analog Y, Pb, and Pr signals to which matrix conversion has been applied by a HDTV (Hi-Vision) method are input from a previous-stage TV camera (not shown) or others to terminals 101, 104, and 107. The Y signal is input to a synchronization separation circuit 111 to be separated into a horizontal synchronizing signal Hs and a vertical synchronizing signal Vs. A clamp-pulse generation circuit 110 generates a clamp pulse according to the horizontal synchronizing signal Hs. A clock generation circuit 118 generates a clock pulse CLK in synchronization with the horizontal synchronizing signal Hs. In the figure, thick lines indicate data bases, and solid lines indicate control buses.

The input Y, Pb, and Pr signals are clamped at a DC level with the use of the clamp pulse CLP by clamp circuits 102, 105, and 108; their clamp outputs 112, 114, and 116 are A/D-converted by quantization circuit 103, 106, and 109 to form a digital Y signal 113, a digital Pb signal 115, and a digital Pr signal 117; and they are input to an inverse matrix conversion circuit 108.

The inverse matrix conversion circuit 108 applies inverse matrix calculation processing to the digital Y, Pb, and Pr signals to generate digital R, G, and B signals and to output them at output terminals 120, 121, and 122.

$$G=k(Y-0.187\,Pb-0.468\,Pr)$$

$$B=k(Y+0.1856\,Pb) \quad (1)$$

$$R=k(Y+1.575\,Pr)$$

These R, G, and B signals are processed by a subsequent-stage display processing circuit (not shown), and displayed on a liquid-crystal display apparatus (not shown) or others.

FIG. 11 shows unclamped Y, Pb, and Pr signals and clamp pulses CLP in a case in which a color bar is displayed, with arrows indicating the pedestal levels of the signals. In this figure, the back porch of each signal has the same level as the pedestal, which is an ideal condition. In an actual case, the Y, Pb, and Pr signals have indefinite DC levels.

As shown in the figure, the Y signal has an image component at the positive side of the pedestal level, and the Pb and Pr signals have image components at both sides of the pedestal level. A level of each signal, close to the pedestal level is clamped to a predetermined level by a clamp pulse CLP.

FIG. 12 shows the relationship between clamped Y, Pb, and Pr signals (the clamp outputs 112, 114, and 116 in FIG. 10) and calculation reference values used for A/D conversion to eight-bit digital signals.

As shown in the figure, when the Y signal is A/D converted such that the pedestal level is set to the minimum digital value Ref_L, "0" and the maximum digital value Ref_H is set to "255," the maximum dynamic range is obtained. When the Pb and Pr signals are A/D converted such that the minimum digital value Ref_L is set to "0," the maximum digital value Ref_H is set to "255," and the pedestal level is set to "127," the maximum dynamic ranges are obtained.

In the conventional image-signal processing apparatus, however, an analog signal system and a digital signal system have the following problem.

FIG. 13 shows the structure of the conventional clamp circuit 102 shown in FIG. 12. The other clamp circuits 105 and 108 have the same structure.

In FIG. 13, the clamp circuit 102 is basically formed of the input terminal 101 to which the Y signal is input, an input terminal 123 to which the clamp pulse CLP is input, a coupling capacitor C201, a switch SW203, a power source E209, an amplifier U208, and an output terminal 124. In addition to these components, parasitic resistors R202, R204, and R206, and parasitic capacitors C205 and C207 connected by dotted lines also exist.

In FIG. 13, after the switch SW203 is closed for the pulse width of the clamp pulse CLP to charge the capacitor C201, the switch SW203 is opened. The pedestal level of the Y signal is clamped to the voltage Vp of the power source E209.

Since the actual circuit includes the parasitic resistors R202, R204, and R206, however, charges may flow in or out from the capacitor C201 due to the leakage effect of the parasitic resistors. In addition, since there are the parasitic capacitors C205 and C207, the charges of the capacitor C201 are distributed. Especially, the capacitor C205 connected in parallel to the switch SW203 is not charged at all when the switch SW203 is closed, as if the capacitor C205 nominally did not exist, but it absorbs charges of the capacitor C201 when the switch SW203 is opened, as if it suddenly appeared.

In the conventional clamp circuit, a voltage shift ΔVp shown in FIG. 14 occurs in the clamp voltage Vp due to the parasitic resistors and parasitic capacitors. FIG. 14 shows that the actual clamp voltage is shifted from the target voltage by ΔVp. When this voltage shift is A/D converted by a quantization circuit, the following shift "err" appears in the A/D conversion output.

$$err=-\Delta Vp/(Ref\_H-Ref\_L)\times 255$$

When inverse matrix conversion is applied to digital Y, Pb, and Pr signals having such a clamp-voltage shift "err," by the calculation expressed by (1) to convert them to R, G, and B signals, because the calculation coefficients differ among the R, G, and B signals, the shift appears differently in the signals, causing deterioration in color balance.

To eliminate the effect of the parasitic resistors and parasitic capacitors, a method has been conventionally considered in which the output voltage is fed back to the power source E209 in FIG. 13. An attempt is also made to reduce the parasitic resistors and parasitic capacitors themselves as much as possible. Any method, however, increases cost.

Further, there was conventionally a problem of precision in a quantization circuit.

FIG. 15 shows the structure of the quantization circuit 103 shown in FIG. 10. The other quantization circuits 106 and 109 have the same structure.

In FIG. 15, the quantization circuit 103 includes an A/D converter 103a. The target voltage is input from the clamp circuit 102, which is the previous-stage circuit, to an input terminal 125, and an A/D conversion output (digital Y signal) is obtained at an output terminal 126. The reference voltage Vref_H and the reference voltage Vref_L are applied to the A/D converter 103a to obtain the digital value "255" and the digital value "0" respectively.

When the reference voltages Vref_H and Vref_L and a voltage of (Vref_H+Vref_L)/2, which is used to obtain the intermediate digital value "127," are input as the target voltage, the A/D conversion outputs obtained at the output terminal 126 have shifts of α, β, and γ as shown in Table 2 due to variations in the precision of the A/D converter 103a.

TABLE 2

| TARGET VOLTAGE | OUTPUT | |
|---|---|---|
| | IDEAL CASE | ACTUAL CASE |
| Vref_H | 255 | 255 − α |
| (Vref_H + Vref_L)/2 | 127 | 127 ± β |
| Vref_L | 0 | 0 + γ |

To increase the precision of the A/D converter 103a to eliminate the shifts α, β, and γ it is necessary that a high current flow into an analog part of the A/D converter 103a. As a result, power consumption increases. In addition, a precise A/D converter is expensive. As described above, conventionally, a large amount of cost and a high power consumption are required to prevent pedestal-level values obtained after quantization from shifting.

SUMMARY OF THE INVENTION

The present invention has been made in consideration of the above-described problems. Accordingly, it is an object of the present invention to eliminate the shifts without requesting a very high precision in a clamp circuit of an analog system and in a quantization circuit of a digital system.

The foregoing object is achieved in one aspect of the present invention through the provision of an image-signal processing apparatus including clamp means for clamping a level of an input image signal to a value close to a predetermined value; digital conversion means for sampling a clamped image signal and for converting it to a digital image signal; and calculation means for obtaining the difference between the pedestal level of the digital image signal and the predetermined value and for compensating the digital image signal according to the difference.

According to the above-described structure, a level of an input image signal is clamped at a value close to the predetermined value by the clamp means, and the clamped video signal is converted to a digital image signal by the digital conversion means. The calculation means obtains the difference between the pedestal level of the digital image signal and the predetermined value, and compensates the digital image signal according to the difference. Therefore, a shift of the pedestal level in the digital image signal, caused by the clamp means and a shift caused by a variation in the precision of the digital conversion means can be compensated for.

In the image-signal processing apparatus, the calculation means may include register means for storing the pedestal level from the output of the digital conversion means; first calculation means for performing addition or subtraction between the pedestal level stored in the register means and the predetermined value; and second calculation means for performing addition or subtraction between the output of the digital conversion means and the output of the first calculation means.

According to the above-described structure, in the calculation means, the register means stores the pedestal level of the digital image signal; the first calculation means performs addition or subtraction between the stored pedestal level and the predetermined value; and the second calculation means performs addition or subtraction between the digital image signal and the output of the first calculation means. Therefore, a digital image signal for which the above-described shifts have been compensated for can be obtained by the second calculation means.

In the image-signal processing apparatus, the calculation means may include register means for storing the pedestal level from the output of the digital conversion means; first calculation means for performing addition or subtraction between the pedestal level stored in the register means and the predetermined value; switching means for switching between the pedestal level stored in the register means and the output of the digital conversion means, and for outputting switched data; and second calculation means for performing addition or subtraction between the output of the switching means and the output of the first calculation means.

According to the above-described structure, in the calculation means, the register means stores the pedestal level of the digital image signal; the first calculation means performs addition or subtraction between the stored pedestal level and the predetermined value; the switching means switches between the stored pedestal level and the digital image signal and outputs switched data; and the second calculation means performs addition or subtraction between the output of the switching means and the output of the first calculation means. Therefore, when the switching means selects and outputs the pedestal level, the second calculation means outputs the predetermined value. The predetermined value can be used for white balance adjustment.

In the image-signal processing apparatus, overflow processing means for limiting the output of the second calculation means to a predetermined range may be provided.

According to the above-described structure, since the overflow processing means limits the output of the second calculation means to a predetermined range, even when the output level of the second calculation means exceeds an upper limit or a lower limit, the output is limited to the predetermined range.

In the image-signal processing apparatus, the register means may include n (n=2, 3, . . . ) latch means connected in series; and averaging means for adding the output of the latch means and for dividing the sum by n.

According to the above-described structure, since the register means includes the n (n=2, 3, . . . ) latch means and the averaging means for adding the output of the latch means and for dividing the sum by n, the effect of noise generated when the register means stores the digital image signal can be reduced.

In the image-signal processing apparatus, second switching means for switching between the output of the second calculation means and the predetermined value used in calculation by the first calculation means and for outputting switched data may be provided after the second calculation means.

According to the above-described structure, since the second switching means for switching between the output of the second calculation means and the predetermined value and for outputting switched data is provided after the second calculation means, when the switching means selects and outputs the predetermined value, the predetermined value can be used for white balance adjustment.

The foregoing object is achieved in another aspect of the present invention through the provision of an image display apparatus including an image-signal processing apparatus described above.

According to the above-described structure, since the image display apparatus includes any image-signal processing apparatus described above, a successful image having no color shift can be displayed according to the above-described operations.

Y, Pr, and Pb signals may be handled as the digital image signal. In this case, the above-described means is provided for each of the Y, Pr, and Pb signals.

BRIEF DESCRIPTION OF THE DRAWINGS

FIG. 3A and FIG. 3B are waveform views showing an operation in the first embodiment.

DESCRIPTION OF THE PREFERRED EMBODIMENTS

Figure 1:
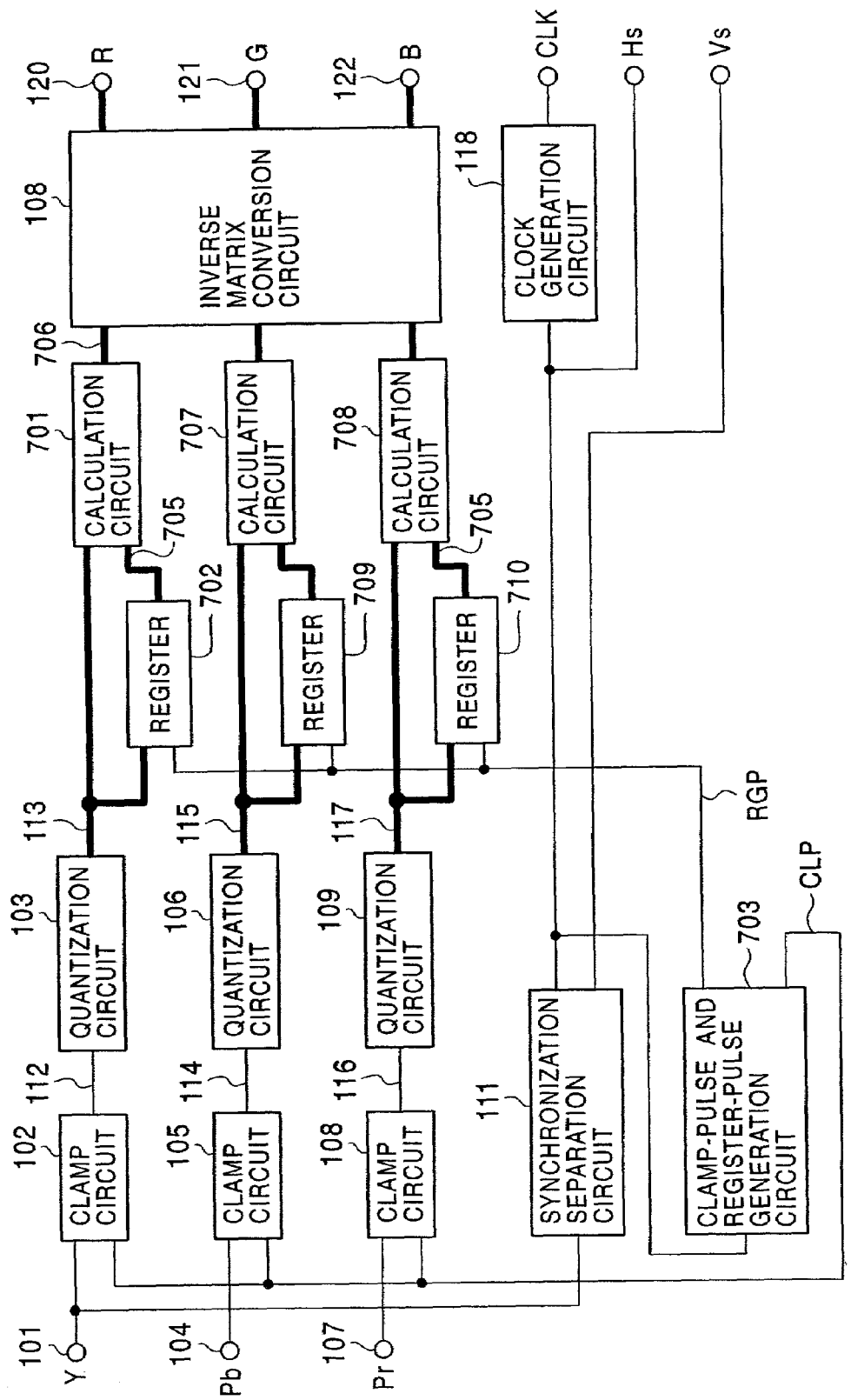
FIG. 1 is a block diagram of an image-signal processing apparatus used in an image display apparatus, according to a first embodiment of the present invention.

Embodiments of the present invention will be described below by referring to the drawings.

Figure 10:
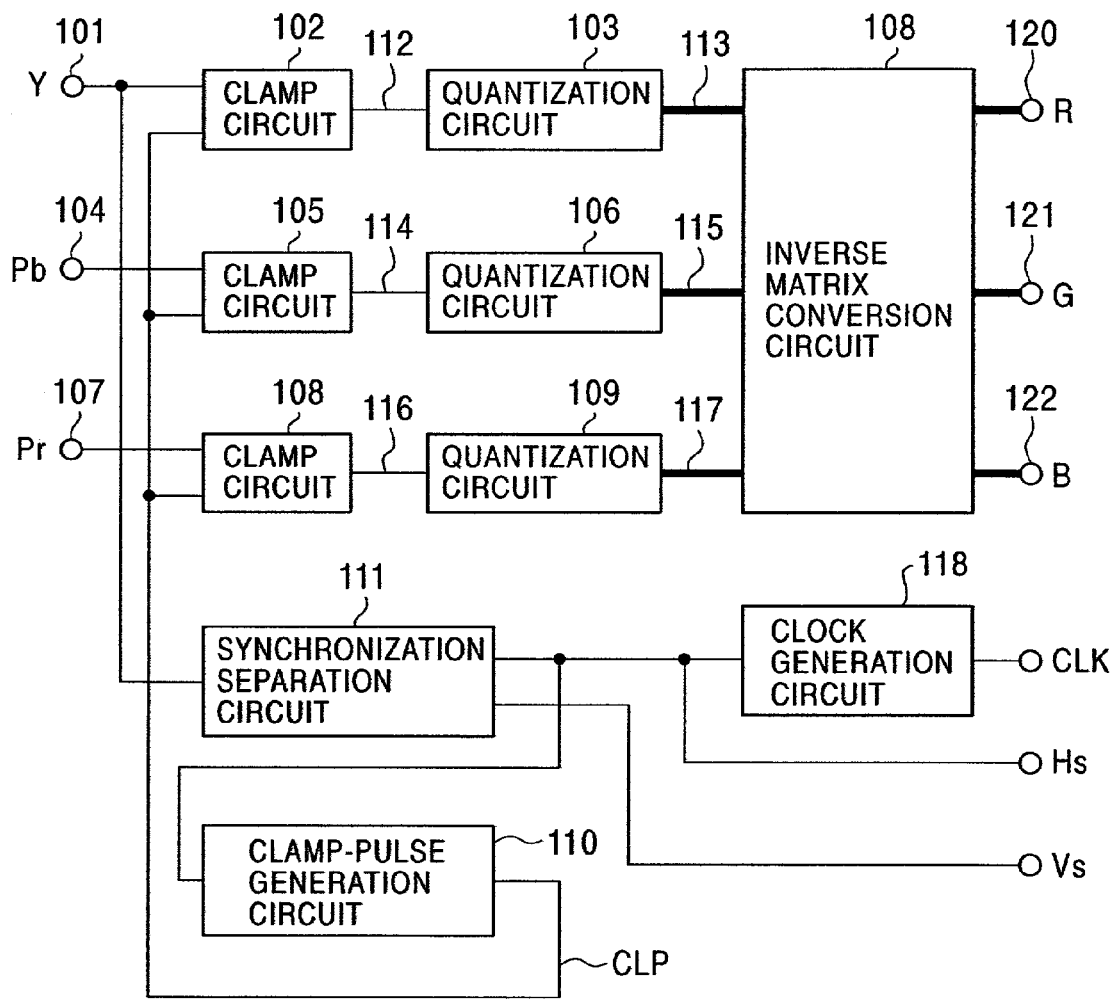
FIG. 10 is a block diagram of an image-signal processing apparatus used in a conventional image display apparatus.
Figure 11:
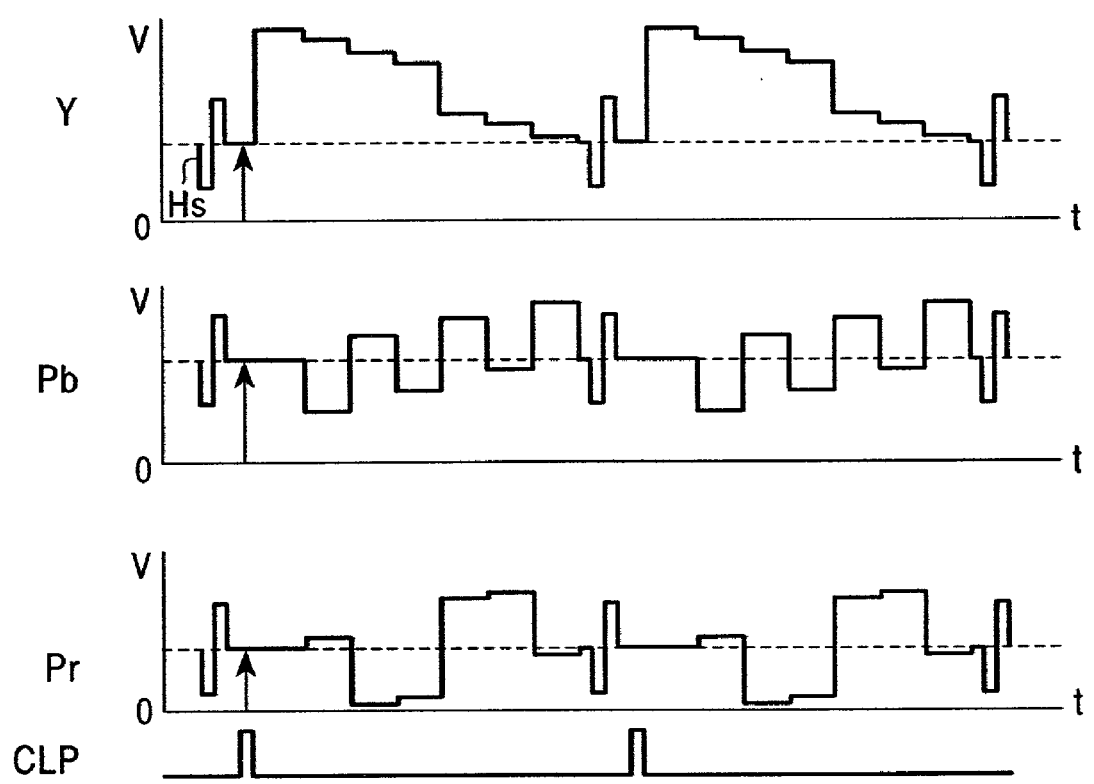
FIG. 11 is a waveform view of Y, Pb, and Pr signals in the conventional image-signal processing apparatus.

FIG. 1 is a block diagram of an image-signal processing apparatus used in an image display apparatus, according to a first embodiment of the present invention. The same symbols as those used in FIG. 10 are assigned to the portions corresponding to those shown in FIG. 10, and descriptions thereof will be omitted.

In FIG. 1, a calculation circuit 701 and a register 702 are provided between a quantization circuit 103 and an inverse matrix conversion circuit 108, and a digital Y signal which is the output 113 of the quantization circuit 103 is input to the calculation circuit 701 and to the register 702. The output 705 of the register 702 is input to the calculation circuit 701, and the output 706 of the calculation circuit 701 is input to the inverse matrix conversion circuit 108.

Calculation circuits 707 and 708 and registers 709 and 710 are provided between quantization circuits 106 and 109 and the inverse matrix conversion circuit 108, respectively, and digital Pb and Pr signals which are the outputs 115 and 117 of the quantization circuits 106 and 109 are input to the calculation circuits 707 and 708 and to the registers 709 and 710, respectively. The outputs of the registers 709 and 710 are input to the calculation circuits 707 and 708, and the outputs of the calculation circuits 707 and 708 are input to the inverse matrix conversion circuit 108.

A clamp-pulse and register-pulse generation circuit 703 is also provided to generate a clamp pulse CLP and a register pulse RGP according to a horizontal synchronizing signal Hs separated by a synchronization separation circuit 111. The register pulse RGP is input to the registers 702, 709, and 710.

In the following description, a circuit structure and an operation for the Y signal are mainly described. The same circuit structure and operation are also provided for the Pb signal and Pr signal.

Figure 2:
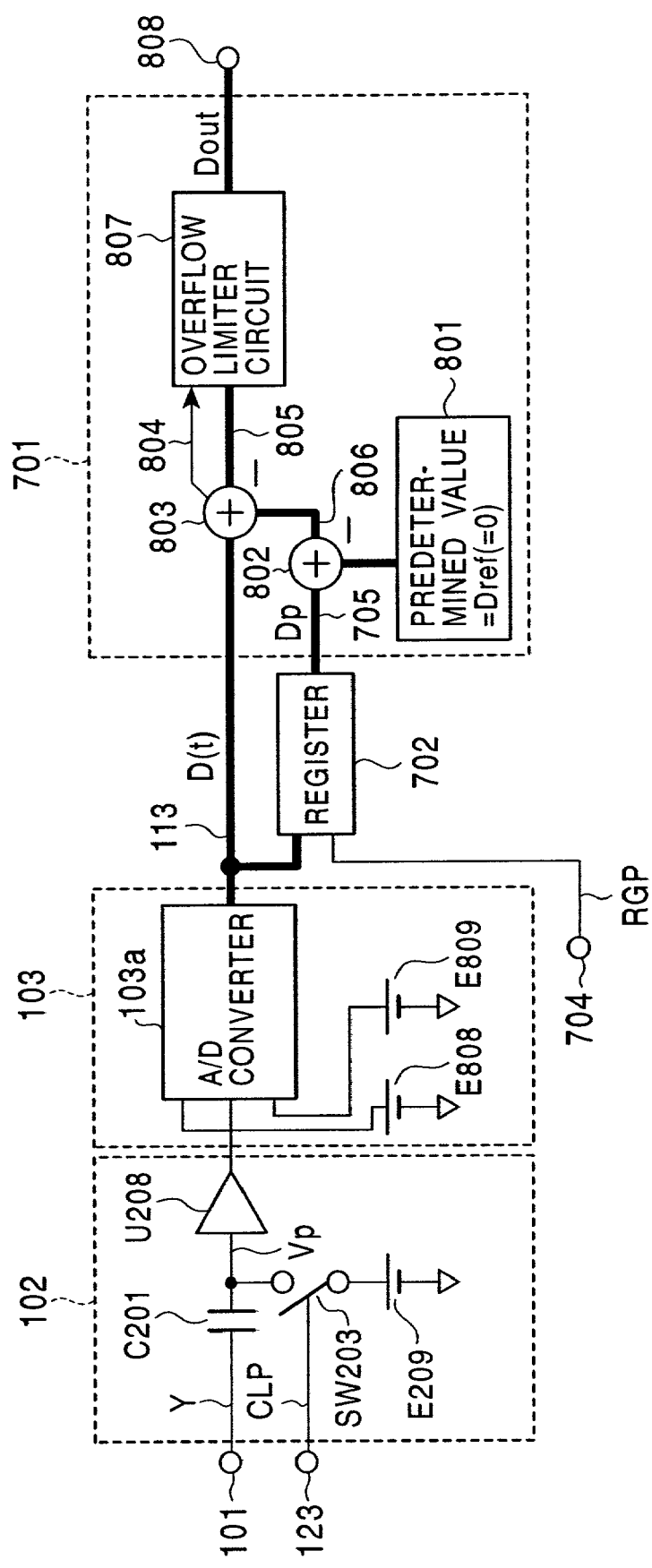
FIG. 2 is a view showing the structures of a clamp circuit, a quantization circuit, a calculation circuit, and a register shown in FIG. 1.
Figure 13:
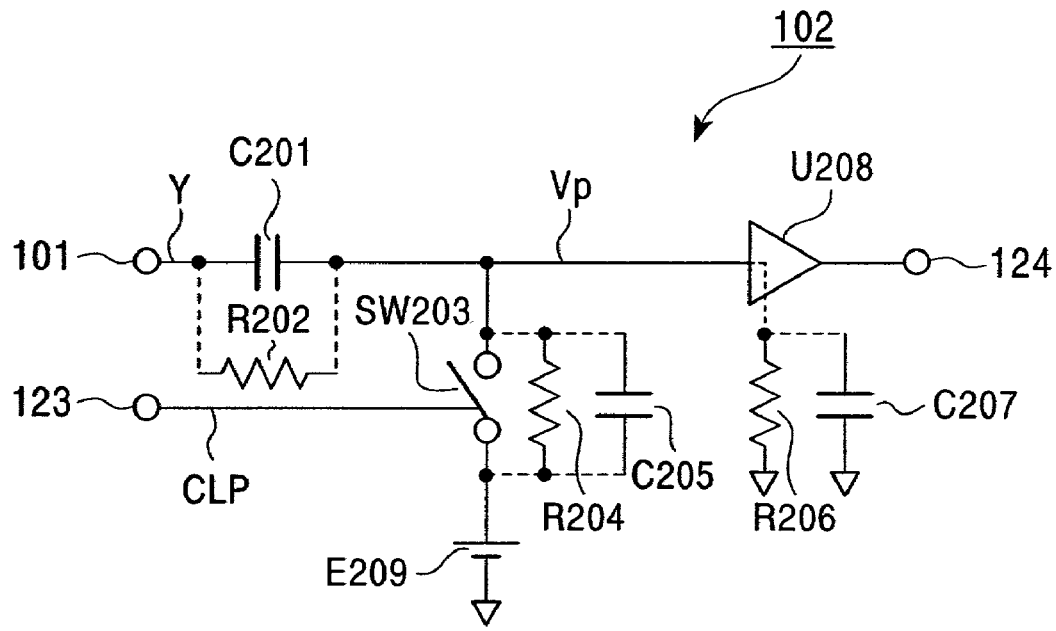
FIG. 13 is a view showing the structure of a clamp circuit used in the conventional image-signal processing apparatus.
Figure 14:
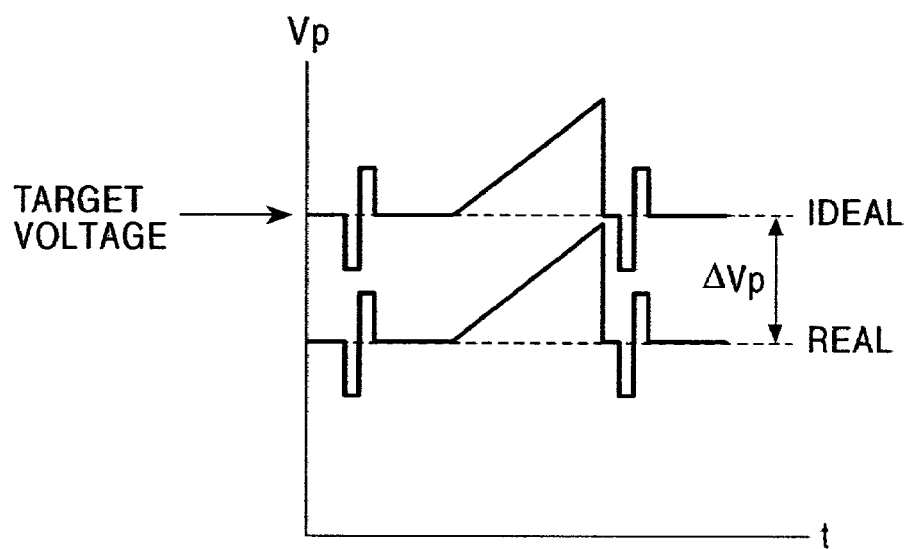
FIG. 14 is a characteristic view showing a problem in the conventional clamp circuit.
Figure 15:
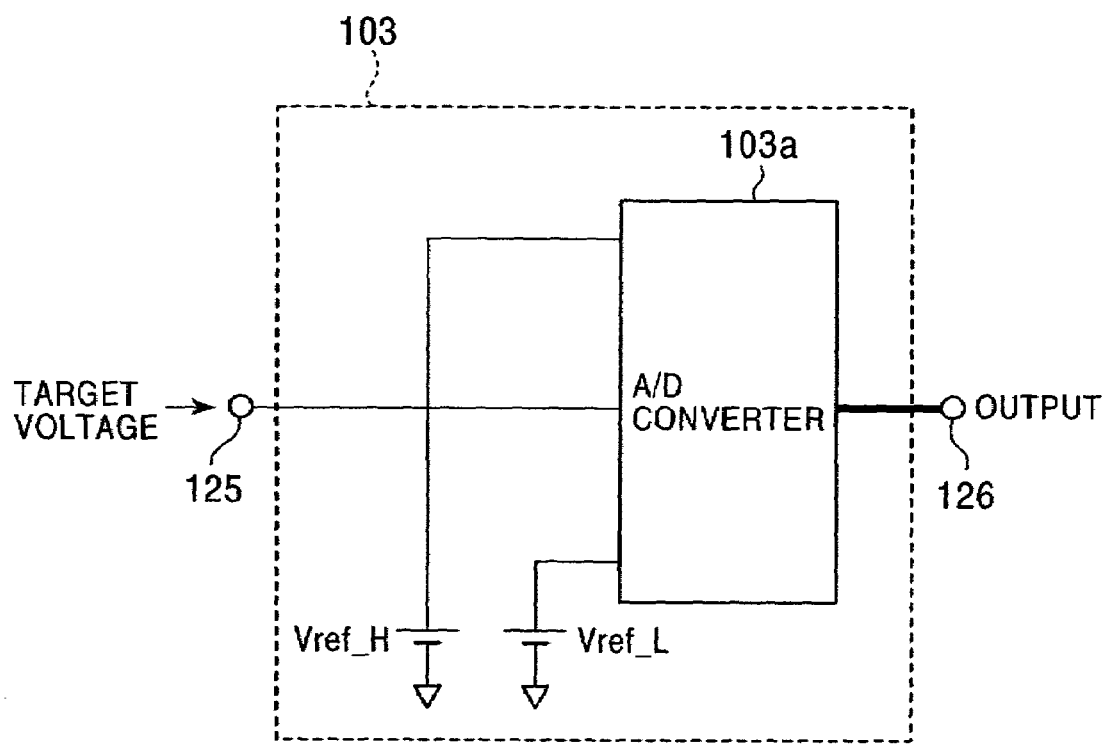
FIG. 15 is a structural view showing a problem in a conventional quantization circuit.

FIG. 2 shows the structures of the register 702, the calculation circuit 701, the clamp circuit 102, and the quantization circuit 103. The clamp circuit 102 and the quantization circuit 103 have the same structures as those shown in FIG. 13 and FIG. 15. The same symbols as those used in FIG. 13 and FIG. 15 are assigned to the portions corresponding to those shown in FIG. 13 and FIG. 15, and descriptions thereof will be omitted. In the clamp circuit 102, parasitic resistors and parasitic capacitors are omitted in the figure. In the quantization circuit 103, E808 indicates a power source for a reference voltage Vref_H, and E809 indicates a power source for a reference voltage Vref_L.

The register pulse RGP is input to an input terminal 704 of the register 702. The register pulse RGP is generated immediately after the clamp pulse CLP, and is used to latch the output 113 (digital Y signal, indicated by D(t)) of the quantization circuit 103. Therefore, the latch output 705 (Dp) of the register 702 includes the above-described shifts generated in the clamp circuit 102 and the quantization circuit 103. A predetermined value Dref generated by a predetermined-value generation circuit 801 is subtracted from the latch output Dp in a subtracter 802. The subtraction output 806 (Dp−Dref) is subtracted from the output D(t) in a subtracter 803.

Figure 12:
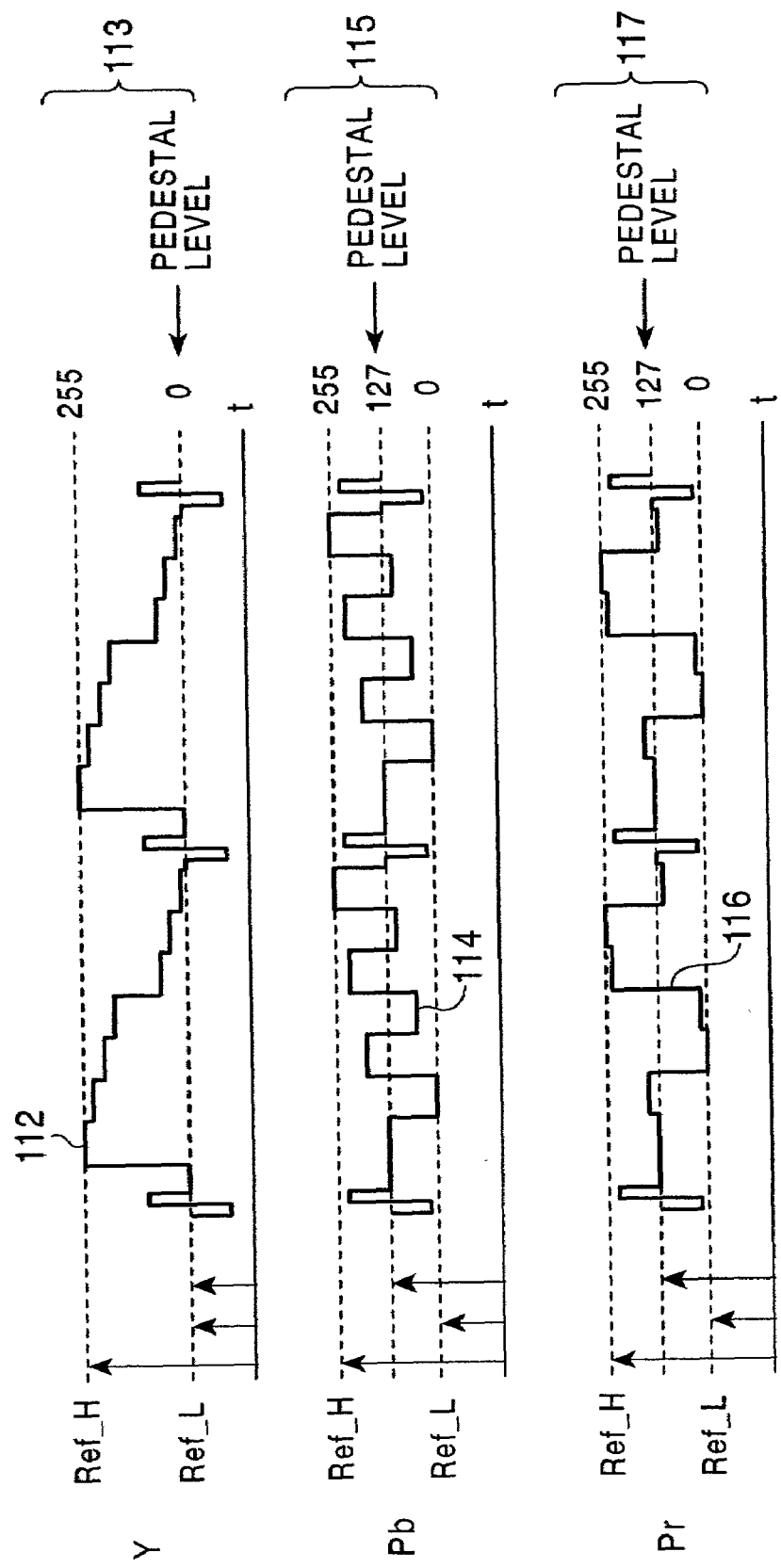
FIG. 12 is a waveform view showing the relationship between the clamp levels of Y, Pb, and Pr signals and calculation reference values for A/D conversion in the conventional image-signal processing apparatus.

The predetermined value Dref is set to "0," which is the digital value of the pedestal level of the Y signal, for the Y signal, and the predetermined value Dref is set to "127," which is the digital value of the pedestal levels of the Pb and Pr signals, for the Pb and Pr signals (as shown in FIG. 12). Therefore, the subtraction output 806 (Dp−Dref) of the subtracter 802 indicates the shift from the pedestal level for the Y signal. This shift is subtracted from D(t) in the subtracter 803 to compensate D(t) for the shift to obtain the subtraction output 805 {D(t)−(Dp−Dref)}.

The subtraction output 805 is input to an overflow limiter circuit 807. When the subtraction output 805 exceeds a predetermined upper limit or a predetermined lower limit, the subtraction output 805 is limited to a predetermined value. To this end, the subtracter 803 sends a carry signal or a borrow signal 804 to the overflow limiter circuit 807 when the subtraction output 805 exceeds the predetermined upper limit or the predetermined lower limit.

A digital Y signal in which the shift has been compensated for and which is within a predetermined dynamic range is obtained from the overflow limiter circuit 807, and it is output as an output Dout from an output terminal 808.

Table 1 shows the relationship among the input (subtraction output 805) and the output Dout of the overflow limiter circuit 807, and the carry signal or the borrow signal 804.

TABLE 1

| 804 | 805 | Dout |
| --- | --- | --- |
| Borrow | less than 0 | 0 |
| — | 0 to 255 both inclusive | D(t) − (Dp − Dref) |
| Carry | 256 or more | 255 |

In table 1, when the subtraction output 805 falls in a range from 0 to 255 both inclusive, the subtraction output is output as is. When the subtraction output is less than 0, 0 is output. When the subtraction output is more than 255, 255 is output.

FIG. 3A and FIG. 3B are waveform charts showing the above-described shift compensation operation. FIG. 3A shows a case in which the latch output Dp (register output 705) is shifted to a smaller-value side of the predetermined value Dref, and FIG. 3B shows a case in which the latch output Dp (register output 705) is shifted to a larger-value side of the predetermined value Dref. Dk indicates an instantaneous value (t=k) of D(t).

In FIG. 3A, the same value as the shift (Dref−Dp) from the pedestal level is added to Dk to obtain a correct output Dout in which the shift has been compensated for.

In FIG. 3B, the same value as the shift (Dref−Dp) from the pedestal level is subtracted from Dk to obtain a correct output Dout in which the shift has been compensated for.

Figure 4:
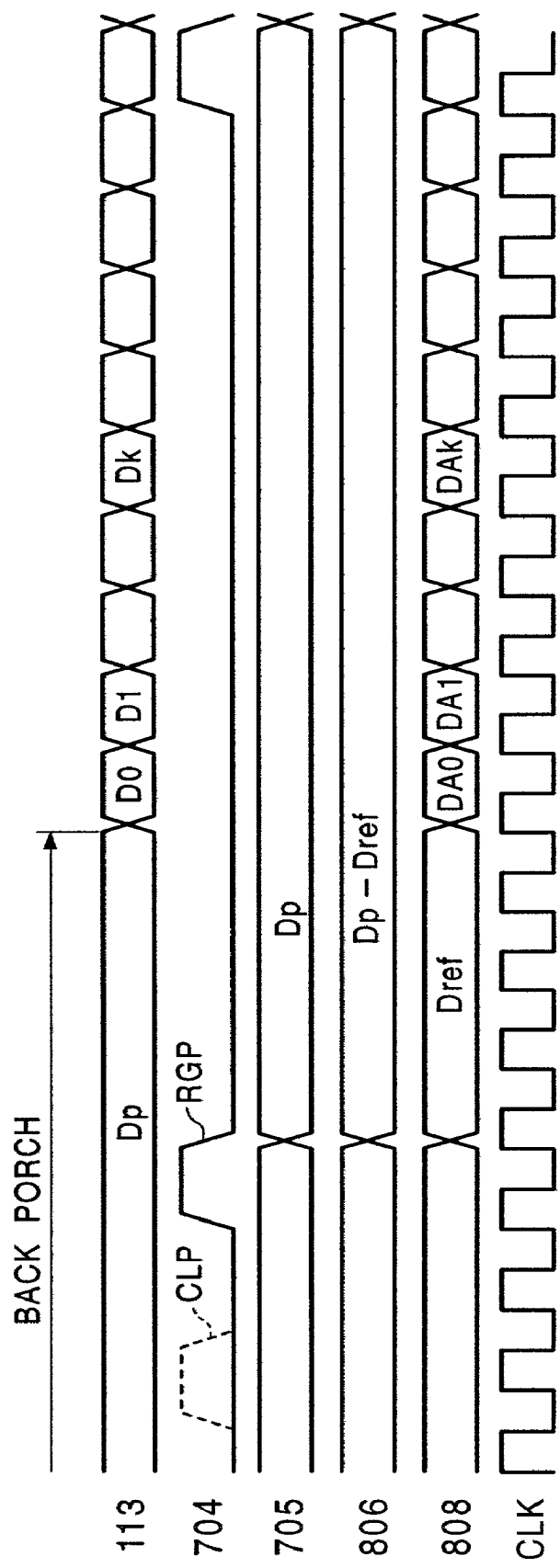
FIG. 4 is a timing chart showing an operation in the first embodiment.

FIG. 4 is a timing chart of signals shown in FIG. 2, obtained during the above-described operation.

In FIG. 4, the output 113 (D(t)) is formed of data Dp at the back porch and the following D0, D1, . . . , Dk, . . . . The data Dp at the back porch is latched by the register pulse RGP generated after the clamp pulse CLP, and D(t) is stored in the register 702. Then, the subtracter 802 obtains the shift (Dp−Dref) in the subtraction output 806, the shift is compensated for by the predetermined value Dref, and Dp and D0, D1, . . . , Dk, . . . are compensated to obtain Dref and DA0, DA1, . . . DAk, . . . . They are limited according to Table 1 by the overflow limiter circuit 807, and then output as Dout.

The same processing as that for the Y signal is applied to the Pb signal and to the Pr signal. The pedestal levels of the Pb and Pr signals are compensated, the Pb and Pr signals are limited to have values within a predetermined range, and the Pb and Pr signals are input to the inverse matrix conversion circuit 108 together with the Y signal.

Figure 5:
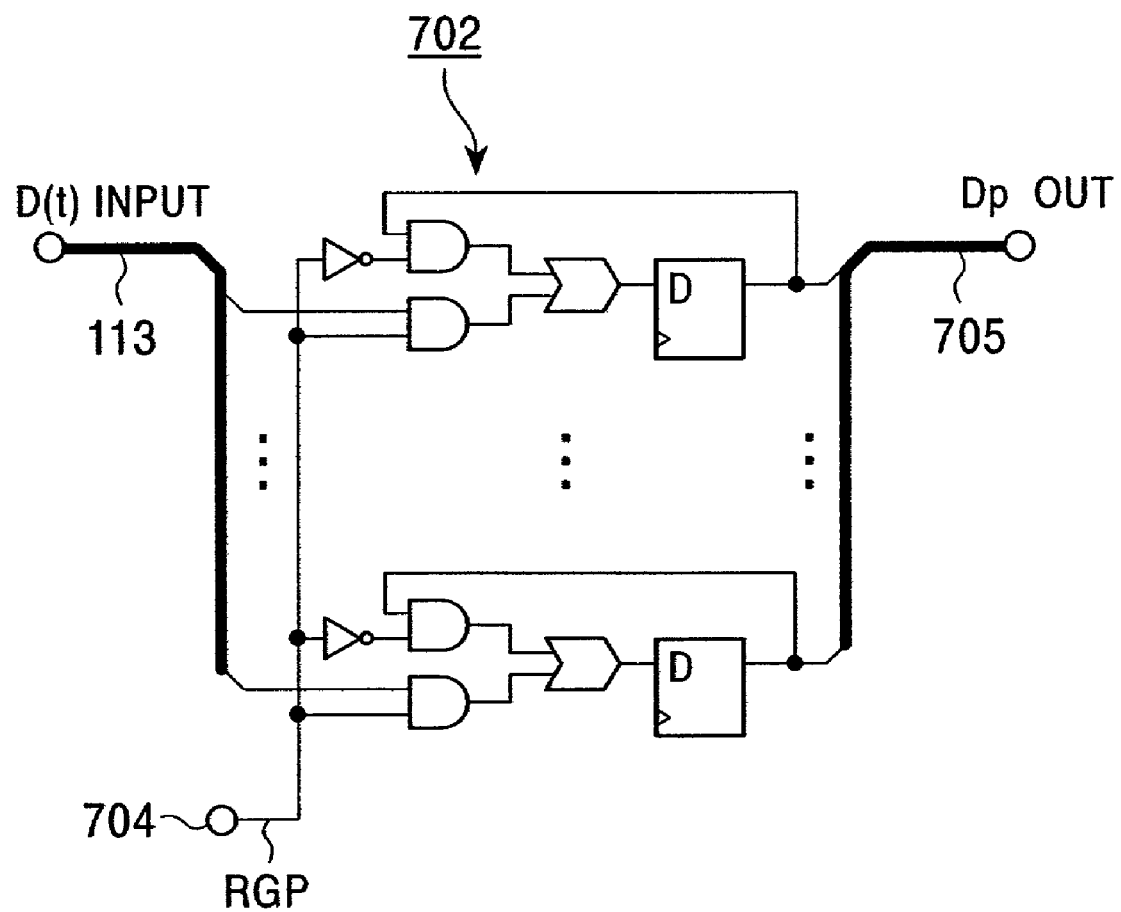
FIG. 5 is a view showing the structure of the register shown in FIG. 1.

FIG. 5 shows an example structure of the register 702. As shown in the figure, a latch circuit is formed of a NAND circuit, an AND circuit, an OR circuit, a D flip-flop, and others. The parallel data D(t) is taken at the rising edge of the register pulse RGP and latched at the falling edge in D flip-flops.

A second embodiment of the present invention will be described next.

Figure 6:
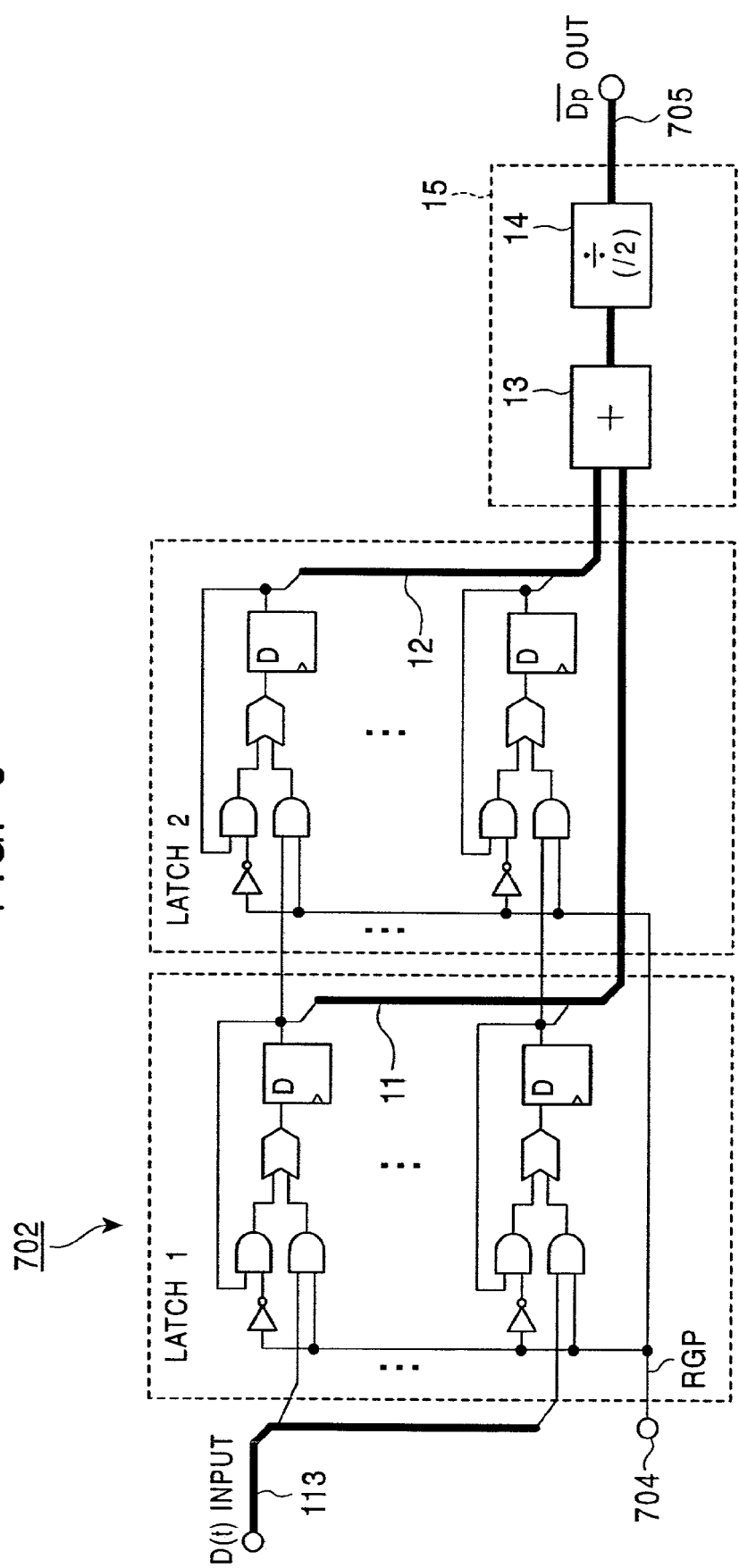
FIG. 6 is a view showing the structure of a register according to a second embodiment of the present invention.

FIG. 6 shows the structure of a register 102 according to the present embodiment, and corresponds to FIG. 5.

In FIG. 6, two latch circuits each of which are the same as that shown in FIG. 5 are connected in series as a latch 1 and a latch 2. The register pulse RGP is input to the latches 1 and 2. The latch 1 latches the output 113 (D(t)) of a quantization circuit 103, which is the preceding-stage circuit, and the latch 2 latches the output of the latch 1. Latch outputs 11 and 12 are input to an averaging circuit 15.

The averaging circuit 15 adds the latch outputs 11 and 12 in an adder 13 and divides the sum by 2 in a division circuit 14 to obtain the average of the latch outputs, and outputs it as the output (Dp).

In the register 702 shown in FIG. 5 according to the first embodiment, an incorrect value may be latched due to the effect of noise. According to the present embodiment, since the latch outputs are averaged, the effect of noise is reduced. When n (n=3, 4, . . . ) sets of latch circuits are provided and the sum of latch outputs are divided by n in the averaging circuit 15, precision becomes further higher.

Figure 7:
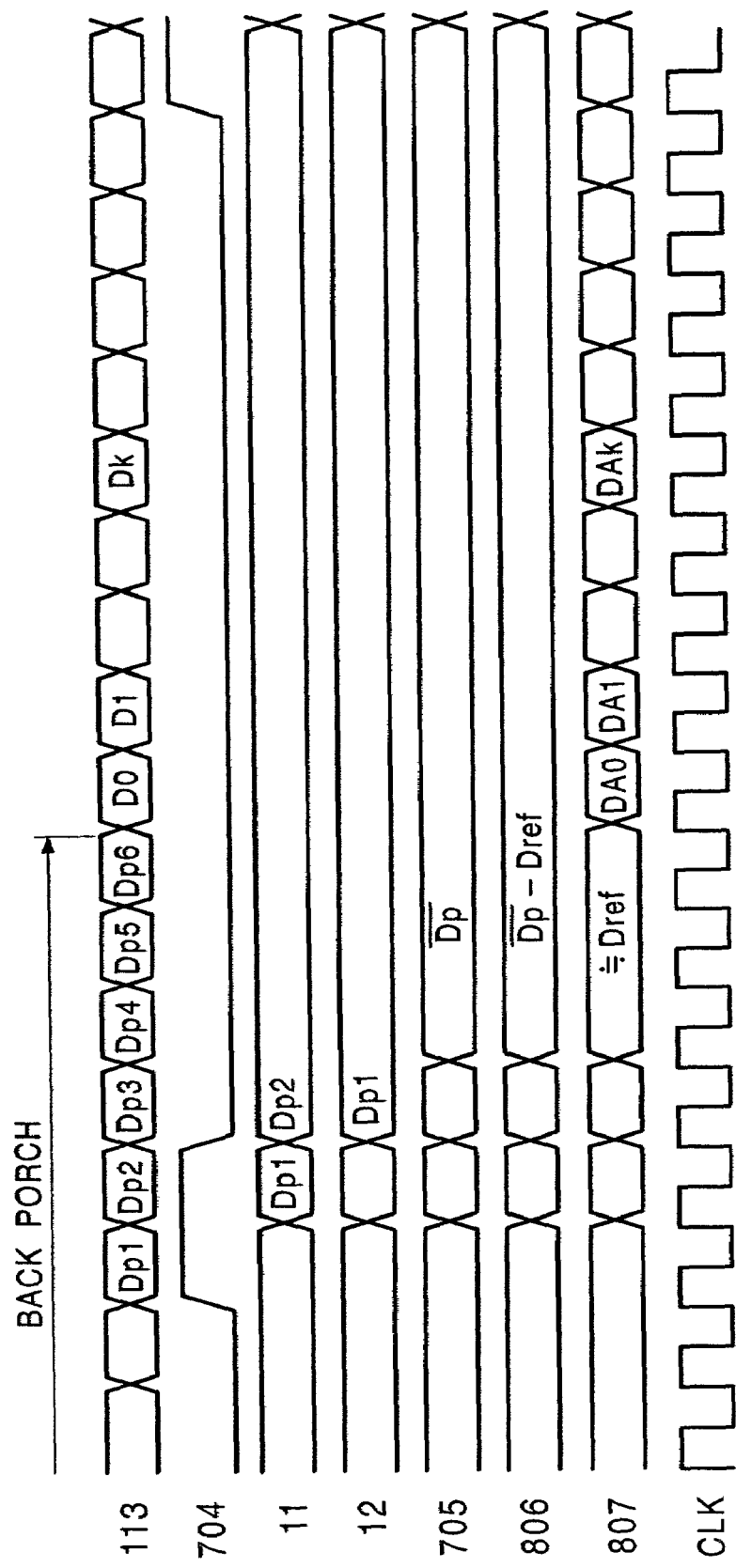
FIG. 7 is a timing chart showing an operation in the second embodiment.

FIG. 7 is a timing chart of signals obtained during the above-described operation of the register 702 shown in FIG. 6 according to the present embodiment.

In FIG. 7, the output 113 (D(t)) is formed of data Dp1, Dp2, . . . and Dp6 at the back porch and the following data D0, D1, . . . , Dk, . . . . In D(t), the data pieces Dp1 and Dp2 at the back porch are latched by the register pulse RGP, which has a pulse width equal to two data pieces, in the latch 1, and the data piece Dp1 is again latched in the latch 2. The data pieces Dp1 and Dp2 are averaged to obtain a register output 705. Then, a subtracter 802 obtains a shift 806 (Dp−Dref). By processing in a subtracter 803 and an overflow limiter circuit 807, (Dp1+Dp2)/2≅Dref, DA0, DA1, . . . , DAk, . . . are output as Dout.

A third embodiment of the present invention will be described next.

The third embodiment relates to a circuit structure having a white balance adjustment function, which is provided for the circuits for the Pb signal and for the Pr signal, shown in FIG. 1.

Figure 8:
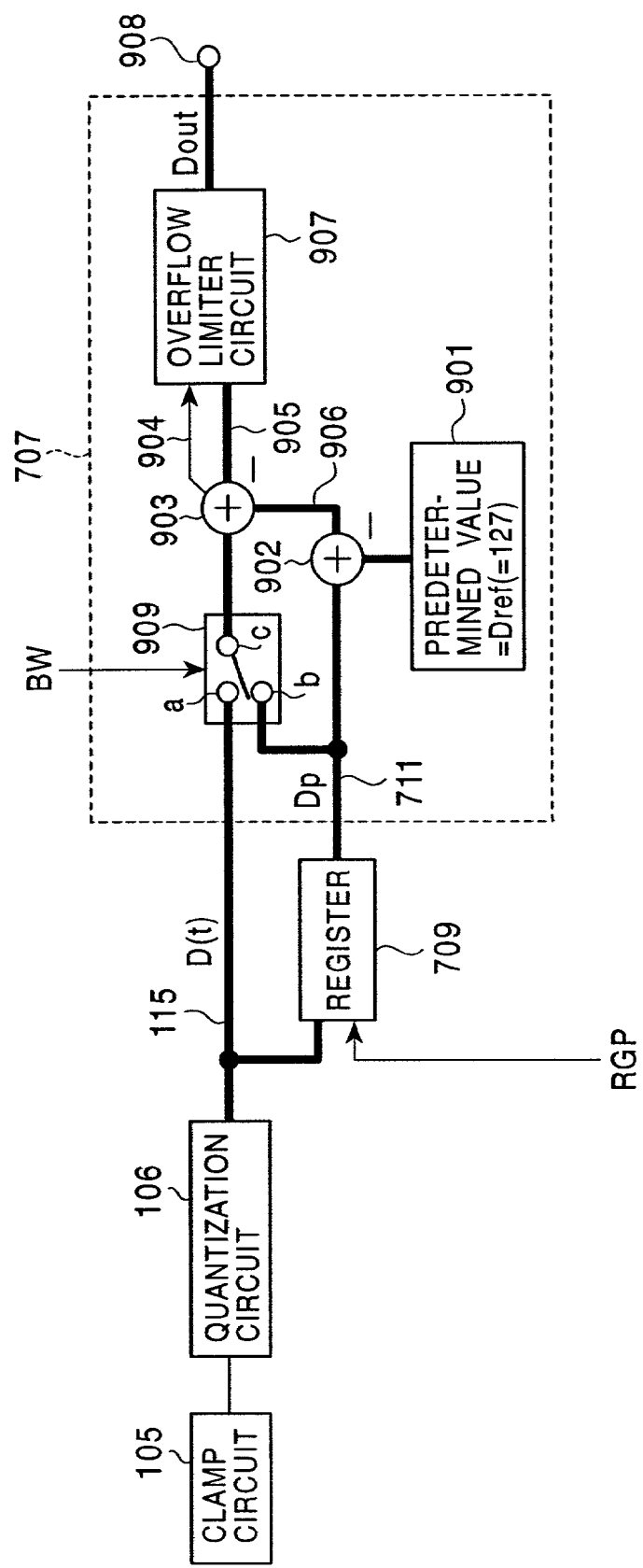
FIG. 8 is a view showing the structures of a clamp circuit, a quantization circuit, a calculation circuit, and a register according to a third embodiment of the present invention.

FIG. 8 is a view showing a case in which the circuit structure according to the present embodiment is provided for the circuit for the Pb signal, and the same symbols as those used in FIG. 1 are assigned to the portions corresponding to those shown in FIG. 1.

In FIG. 8, a clamp circuit 105, a quantization circuit 106, a calculation circuit 707, and a register 709 are provided in the same way as in FIG. 1. The output 115 (D(t)) of the quantization circuit 106 is input to the register 709 as well as to the calculation circuit 707.

In the calculation circuit 707, the output 115 is input to a subtracter 903 through contacts "a" and "c" of a switch 909. The output 711 (Dp) of the register 709 is input to a subtracter 902 as well as through contacts "b" and "c" of the switch 909 to the subtracter 903. The switch 909 is switched by a switch control signal BW to the contact "b" side when white balance adjustment is to be performed.

A predetermined-value generation circuit 901 generates a predetermined value Dref of 127. This value is subtracted from the output 711 in the subtracter 902. A subtraction output 906 is subtracted from the output of the switch 909 in the subtracter 903.

Circuits and signals 901, 902, 903, 904, 905, 906, 907, and 908 shown in FIG. 8 correspond to those 801, 802, 803, 804, 805, 806, 807, and 808 shown in FIG. 2.

FIG. 8 shows the structure of the calculation circuit 707 for the Pb signal. A calculation circuit 708 for the Pr signal has the same structure as the calculation circuit 707.

According to the above structure, the switch 909 is switched to the contact "a" side in a normal operation, the same operation as when the Y signal is processed, described before by referring to FIG. 2, is performed, and the output 115 of the quantization circuit 106 is compensated for the shift.

When white balance adjustment is performed, the switch 909 is switched to the contact "b" side, and the output 711 of the register 709 is input to the subtracter 903 through the switch 909. As a result, the calculation circuit 707 performs the following calculation, applies overflow processing to Dref, and the result is output as Dout.

$$Dp-(Dp-Dref)=Dref$$

Also in the calculation circuit 708 for the Pr signal, having the same structure, overflow processing is applied to Dref and the result is output as Dout. Overflow processing is applied to the Y signal for which the shift has been compensated for, and the result is output as Dout in the calculation circuit 701 for the Y signal, shown in FIG. 2.

Therefore, the compensated Y signal and the Pb and Pr signals having Dref as the reference value of the pedestal level of a color signal are used to perform an appropriate white balance adjustment.

A fourth embodiment of the present invention will be described next.

The fourth embodiment is another embodiment for providing white balance adjustment.

Figure 9:
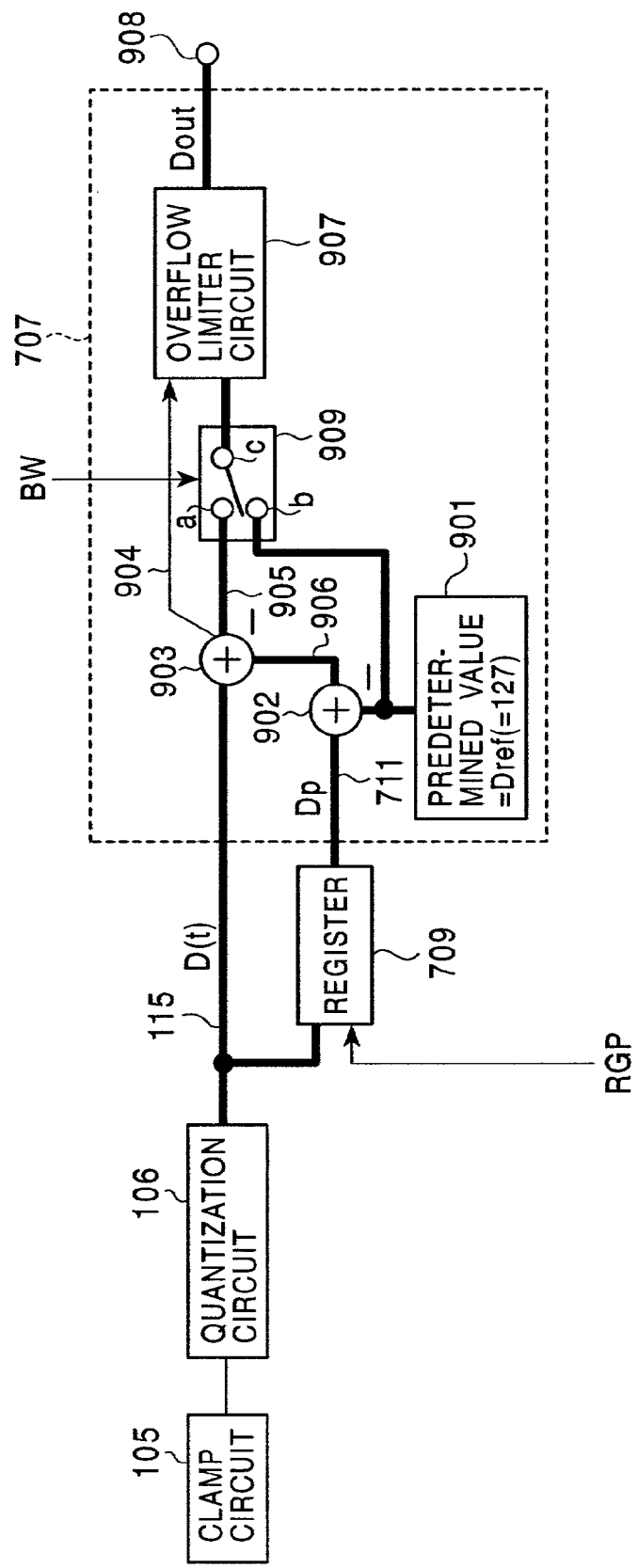
FIG. 9 is a view showing the structures of a clamp circuit, a quantization circuit, a calculation circuit, and a register according to a fourth embodiment of the present invention.

FIG. 9 is a view showing the structure of a calculation circuit 707 according to the present embodiment. The same symbols as those used in FIG. 8 are assigned to the portions corresponding to those shown in FIG. 8, and descriptions thereof will be omitted.

In the calculation circuit 707 shown in FIG. 9, a switch 909 is provided after a subtracter 903, and a predetermined value Dref is sent to a contact "b." With this structure, Dref can be taken out directly during white balance adjustment by switching the switch 909 to the contact "b" side.

A calculation circuit 708 for the Pr signal has the same structure.

According to the above-described structure, the compensated Y signal and the Pb and Pr signals having Dref as the reference value of the pedestal level are used to provide a white balance adjustment function, in the same way as in the third embodiment.

As described above, according to the present invention, the following advantages are obtained.

According to the present invention, a shift of the pedestal level, generated when digital conversion means converts an analog image signal to a digital image signal after the pedestal level of the analog image signal is clamped by clamp means, and a shift caused by a variation in precision of the digital conversion means can be compensated for. Therefore, it is not necessary to use clamp means and digital conversion means having especially high precision, and an image-signal processing apparatus can be implemented at a low cost.

Further, according to the present invention, since the pedestal level read from a digital image signal and a predetermined value are used for calculation, a digital image signal having a predetermined pedestal level can be obtained, for which the above shifts have been compensated for.

Further, according to the present invention, since switching means is switched to output the predetermined value, a precise white balance adjustment function is implemented by the use of the predetermined value.

Further, according to the present invention, since overflow processing for limiting the calculation output of calculation means to a predetermined range is performed, the dynamic range of an output digital image signal is always within the predetermined range.

Further, according to the present invention, since register means is formed of a plurality of latch means, and the average of latch outputs is obtained, the effect of noise generated when the register means reads a digital image signal is reduced.

Further, an image display apparatus according to the present invention includes any of the above-described image-signal processing apparatuses, the corresponding advantage is obtained, and a successful image having no color shift can be displayed.

What is claimed is:

1. An image-signal processing apparatus comprising:
   clamp means for clamping a level of an input image signal to a value close to a predetermined value;
   digital conversion means for sampling a clamped image signal and for converting it to a digital image signal; and
   calculation means for obtaining the difference between the pedestal level of the digital image signal and the predetermined value and for compensating the digital image signal according to the difference,
   wherein the calculation means includes
   register means for storing the pedestal level from the output of the digital conversion means;
   first calculation means for performing addition or subtraction between the pedestal level stored in the register means and the predetermined value; and
   second calculation means for performing addition or subtraction between the output of the digital conversion means and the output of the first calculation means.

2. An image-signal processing apparatus comprising:
   clamp means for clamping level of an input image signal to a value close to a predetermined value;
   digital conversion means for sampling a clamped image signal and for converting it to a digital image signal; and
   calculation means for obtaining the difference between the pedestal level of the digital image signal and the predetermined value and for compensating the digital image signal according to the difference,
   wherein the calculation means includes
   register means for storing the pedestal level from the output of the digital conversion means;
   first calculation means for performing addition or subtraction between the pedestal level stored in the register means and the predetermined value;
   switching means for switching between the pedestal level stored in the register means and the output of the digital conversion means, and for outputting switched data; and
   second calculation means for performing addition or subtraction between the output of the switching means and the output of the first calculation means.

3. An image-signal processing apparatus according to claim 1, wherein overflow processing means for limiting the output of the second calculation means to a predetermined range is provided.

4. An image-signal processing apparatus according to claim 1, wherein the register means comprises:
   n(n=2, 3, . . . ) latch means connected in series; and
   averaging means for adding the output of the latch means and for dividing the sum by n.

5. An image-signal processing apparatus according to claim 1, wherein second switching means for switching between the output of the second calculation means and the predetermined value used in calculation by the first calculation means and for outputting switched data is provided after the second calculation means.

6. An image display apparatus comprising an image-signal processing apparatus according to claim 1.

7. An image-signal processing apparatus according to claim 2, wherein overflow processing means for limiting the output of the second calculation means to a predetermined range is provided.

8. An image-signal processing apparatus according to claim 2, wherein the register means comprises:
   n(n=2, 3, . . . ) latch means connected in series; and
   averaging means for adding the output of the latch means and for dividing the sum by n.

9. An image display apparatus comprising an image-signal processing apparatus according to claim 2.

* * * * *